United States Patent
Niederholz et al.

(10) Patent No.: US 7,773,698 B2
(45) Date of Patent: Aug. 10, 2010

(54) RADIO RECEIVER WITH A DEMODULATION UNIT FOR GENERATING SOFTBITS

(75) Inventors: Juergen Niederholz, Geldern (DE); Christian Drewes, Germering (DE)

(73) Assignee: Infineon Technologies AG, Munich (DE)

( * ) Notice: Subject to any disclaimer, the term of this patent is extended or adjusted under 35 U.S.C. 154(b) by 838 days.

(21) Appl. No.: 11/411,158

(22) Filed: Apr. 25, 2006

(65) Prior Publication Data
US 2006/0245524 A1  Nov. 2, 2006

(30) Foreign Application Priority Data
Apr. 25, 2005  (DE) .................. 10 2005 019 176

(51) Int. Cl.
H04L 27/06  (2006.01)
(52) U.S. Cl. ..................................... 375/340
(58) Field of Classification Search ................ 375/260, 375/340; 370/208, 342, 310, 319
See application file for complete search history.

(56) References Cited

U.S. PATENT DOCUMENTS

| | | | |
|---|---|---|---|
| 5,191,576 A * | 3/1993 | Pommier et al. ............ 370/312 |
| 6,345,377 B1 * | 2/2002 | Kroeger et al. .............. 714/790 |
| 6,580,705 B1 * | 6/2003 | Riazi et al. .................. 370/347 |
| 7,379,445 B2 * | 5/2008 | Guo et al. .................... 370/343 |
| 2006/0222092 A1 * | 10/2006 | Guo et al. .................... 375/260 |
| 2007/0140164 A1 * | 6/2007 | Zeng et al. .................. 370/329 |

FOREIGN PATENT DOCUMENTS

EP  1 195 908 A2  4/2002

OTHER PUBLICATIONS

3GPP TS 25.211 V4.6.0 (Sep. 2002) $3^{rd}$ Generation Partnership Project; Technical Specification Group Radio Access Network; Physical channels and mapping of transport channels onto physical channels (FDD), (Release 4), 46 pgs.

* cited by examiner

*Primary Examiner*—Chieh M Fan
*Assistant Examiner*—Jaison Joseph
(74) *Attorney, Agent, or Firm*—Eschweiler & Associates, LLC

(57) ABSTRACT

The invention relates to a radio receiver for receiving received signals transmitted by radio. The radio receiver includes a demodulation unit for demodulating the received signals and a first estimating unit for estimating the noise power of the received signals. The demodulation unit outputs the demodulated received signals as softbits and sets the weighting of the least significant softbit in dependence on the estimated noise power of the received signals.

18 Claims, 2 Drawing Sheets

RADIO RECEIVER WITH A DEMODULATION UNIT FOR GENERATING SOFTBITS

REFERENCE TO RELATED APPLICATIONS

This application claims the benefit of the priority date of German application DE 10 2005 019 176.2, filed on Apr. 25, 2005, the contents of which are herein incorporated by reference in their entirety.

FIELD OF THE INVENTION

The invention relates to a radio receiver of a radio transmission system. To demodulate the received signals, the radio receiver has a demodulation unit which generates softbits at its output. The invention also relates to a corresponding method.

BACKGROUND OF THE INVENTION

In the signal path of a radio transmitter, two blocks which handle the coding and the modulation of the transmit signals can be distinguished by their function. These are called an outer transmitter and an inner transmitter. The outer transmitter, by coding the transmit data, generates bits $d_k$ which are modulated onto a carrier frequency by the inner transmitter and are then transmitted by means of an antenna.

In corresponding manner to the radio transmitter, a radio receiver has an inner receiver and an outer receiver. In the inner receiver, the received radio signals are demodulated and converted into softbits $s_k$. The softbits $s_k$, which are still coded, are then decoded by the outer receiver.

In consequence, the bits $d_k$ generated by the outer transmitter in the radio transmitter are reconstructed in the form of softbits $s_k$ with the aid of the inner receiver. The mapping of the bits $d_k$ onto the softbits $s_k$, and thus the quality of the softbits, is significantly determined by the quality of the inner receiver, apart from the transmission characteristics and the characteristics of the radio-frequency front end of the radio receiver.

Depending on the radio transmission system and, in particular, on the outer receiver which processes the softbits further, various measures can be used for assessing the quality of the softbits and of the inner receiver generating the softbits. For example, the softbits can be assessed by means of the distortion to which they are subjected by the quantizing. Since, as a rule, the softbits are present as fixed-point numbers in conventional radio receivers, the number of bits used for representing numbers contributes decisively to the quality of the softbits. The quantization noise can be reduced to below any threshold of greater than zero by means of a sufficiently large number of bits. However, critical cost factors of a digital integrated circuit such as the chip area needed or the energy consumption are also increased with the bit width.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

In accordance with an aspect of the invention, a radio receiver for receiving received signals transmitted via radio is provided. The radio receiver includes a first estimating unit and a demodulation unit. The first estimating unit for estimating the noise power of the received signals as an estimated noise power. The demodulation unit for demodulating the received signals and generating demodulated received signals as softbits and setting a weighting of a least significant softbit of the softbits according to the estimated noise power. The radio receiver, in an alternate aspect, can include a second estimating unit for estimating a signal power of the received signals, wherein the demodulation unit sets a weighting of a most significant softbit of the softbits according to the estimated signal power.

Aspects of the present invention include a radio receiver with a demodulation unit by means of which softbits can be generated and with reduced possible quantization error. Other aspects include a method for processing received signals.

The radio receiver according to the invention is part of a radio transmission system which, apart from the radio receiver, also has a radio transmitter. The radio transmitter transmits modulated transmit signals which are received by the radio receiver as received signals. After that, the received signals are down converted into the baseband, possibly processed and digitized. For the following demodulation of the modulated received signals, a demodulation unit is connected into the received path in the radio receiver according to the invention. In this arrangement, the received signals can also be subjected to preprocessing before the demodulation. The demodulated received signals or the preprocessed and demodulated received signals, respectively, are output by the demodulation unit as softbits at its output. If the radio receiver according to the invention is based on a conventional receiver design, the demodulation unit, in consequence, represents the inner receiver.

Unlike a conventional radio receiver, the radio receiver according to the invention additionally comprises a first estimating unit which estimates the noise power of the received signals and forwards the estimated value determined to the demodulation unit. The demodulation unit uses the value of the estimated noise power for selecting by means of this value the weighting of the least significant softbits by means of an adjustable scaler in the number representation of the softbits. With a binary number representation of the softbits, the weighting of a bit is the power of two by which the bit is multiplied for the number representation.

In one embodiment, the demodulation unit according to the invention has the effect that, for the number representation of the softbits, such a range of values can be found which provides both for low quantization noise and for implementation. Thus, the noise power of the received signals represents an appropriate measure by means of which the weighting of the least significant softbit can be selected in order to keep the distortion caused by the quantization below an appropriate threshold. Furthermore, the invention provides for the number representation of the softbits with a minimum or reduced number of bits since due to the suitable selection of the weighting of the least-significant bit, the range of bits of the softbits can be kept small. Due to this measure, unnecessary chip area requirement and energy consumption can be prevented. In consequence, the invention makes it possible for low quantization noise and for a small number of bits for number representation of the softbits.

In one example, the implementation effort/cost for a radio receiver is relatively low since an estimating unit for estimating the noise power of the received signals can be already present in some radio receivers.

In another aspect, a radio receiver according to the invention includes a second estimating unit which has the task of estimating the signal power of the received signals. The estimated value determined by the second estimating unit is supplied to the demodulation unit which, in this embodiment, also sets the weighting of the most significant softbit as well as setting the weighting of the least significant softbit described above. In this arrangement, the weighting of the most significant bit is selected by the demodulation unit in dependence on the estimated signal power of the received signals. The result of this embodiment of the invention is that a saturation of the softbits is highly improbable, i.e. the case where a demodulated received signal cannot be represented by means of the range of bits selected will occur only rarely. Additionally, an estimating unit for estimating the signal power is frequently already provided in conventional radio receivers for other reasons so that in such cases, the additional expenditure for implementing the radio receiver according to the invention is relatively small.

In another aspect, it can also be provided that the bit width, i.e. the number of softbits, is permanently predetermined. This means that, after the selection of the least significant softbit, the most significant softbit is already determined and does not need to be determined with the aid of the estimated signal power of the received signals. As a result, the second estimating unit can be avoided.

In another aspect, the radio receiver according to the invention provides for the demodulation unit to be constructed in such a manner that it sets the weighting of the least significant softbit in such a manner that the maximum quantization error is small in comparison with the noise component of the softbits which already exists, in any case. This is equivalent to the demand that the quantization noise power caused by the maximum quantization error be much smaller than the estimated noise power of the received signals. This criterion for selecting the weighting of the least-significant softbit has the effect that the signal-noise power ratio is not significantly impaired by the generation of the softbits since the noise additionally generated by the quantization is negligible compared with the noise component of the softbits which is present, in any case.

The demodulation unit, in one example, sets the weighting $2^m$ ($m \in N_0$) of the least significant softbit by means of the estimated noise power $N_0$, in such a manner that the following relationship is satisfied:

$$2^m \leq \frac{\sqrt{N_0}}{5} \qquad (1)$$

The requirement of equation (1) has the effect that the following relationship holds true for the maximum quantization error $2^{m-1}$:

$$2^{m-1} \leq \frac{\sqrt{N_0}}{10} \qquad (2)$$

In equation (2), the maximum quantization error $2^{m-1}$ is selected to be smaller by at least one power of ten than the standard deviation $\sigma$ of the noise for which $\sigma^2 = N_0$ applies. This limit value can, in one example, keep the additional noise generated by the quantization as low as possible since inaccuracies in a conventional noise power estimation are also taken into consideration by this value.

If only the noise power and not the signal power of the received signals are taken into consideration for determining the range of values of the softbits, and the bit width M is correspondingly predetermined, it is appropriate to select the weighting $2^m$ of the least significant softbit to be less by at least a factor of 2 than according to the equation (1):

$$2^m \leq \frac{\sqrt{N_0}}{10} \qquad (3)$$

According to a further, embodiment of the invention, a maximum value is predetermined for the signal-noise power ratio of the softbits for setting the weighting of the least significant softbit. Correspondingly, it is possible to estimate, after a measurement of the current signal-noise power ratio of the received signals, which quantization noise is still acceptable so that the maximum value of the signal-noise power ratio of the softbits is not exceeded. The weighting of the least significant softbit can be selected by means of the tolerable quantization noise.

In accordance with another aspect, the radio receiver according to the invention provides for the weighting of the most significant softbit to be set by the demodulation unit by means of the estimated signal power of the received signals, in such a manner that the demodulated received signals can be unambiguously represented in the range of bits determined by this means. Accordingly, a saturation in the number representation of the demodulated received signals due to too low an upper limit of the range of bits of the softbits will only occur with very low probability.

The weighting $2^{m+M-1}$ of the most significant softbit is selected by the demodulation unit by means of the estimated signal power $S_0$ of the received signals, in such a manner that essentially the following equation applies:

$$2^{m+M-1} = \sqrt{S_0} \qquad (4)$$

Selecting the weighting $2^{m+M-1}$ of the most significant softbit by means of equation (4) prevents with high probability that the demodulated received signals cannot be represented by means of the range of bits selected for the softbits due to a saturation.

A further measure consists of predetermining a minimum bit width with a variable bit width. This prevents the circuit expenditure for implementing the radio receiver according to the invention from possibly becoming too high.

It is also of advantage to keep both the selected weighting of the least significant softbit and possibly the selected weighting of the most significant softbit constant over a predetermined period of time. The predetermined period of time can be, for example, a time slot or a time frame.

The method according to the invention is used for processing received signals received by radio and comprises:

(a) estimating the noise power of the received signals; and
(b) demodulating the received signals, the demodulated received signals being represented as softbits and the weighting of the least significant softbit being selected in dependence on the estimated noise power of the received signals.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

In the text which follows, the invention will be explained in greater detail in an illustrative manner, referring to the drawings.

DETAILED DESCRIPTION OF THE INVENTION

The present invention will now be described with respect to the accompanying drawings in which like numbered elements represent like parts. The figures provided herewith and the accompanying description of the figures are merely provided for illustrative purposes. One of ordinary skill in the art should realize, based on the instant description, other implementations and methods for fabricating the devices and structures illustrated in the figures and in the following description.

A solution for minimizing or reducing the quantization error is to dimension the bit width and the range of values of the softbits permanently in such a manner that the softbits only exhibit a slight transmission error and a slight probability of saturation for all transmission scenarios realistically occurring. The disadvantage of this solution is that the bit width and the quantity of bits of the softbits are determined by worst-case scenarios and, for this reason, are overdimensioned for many transmission scenarios for which a lesser bit width would be adequate, so that the requirement of chip area and the energy consumption are unnecessarily high.

To improve the solution described above, the range of values of the softbits can be made variable. To select a suitable range of values, a bit analysis is expediently performed. For this purpose, for example, the least significant bit (LSB) and the most significant bit (MSB) are observed and the range of values of the softbits is shifted towards more significant or less significant bits in dependence on the ones and zeros occurring. The advantage of this selection of the range of values of the softbits is that in comparison with the solution described above, a lesser bit width can be selected. The disadvantageous factor in this solution is, however, that a relatively elaborate unit for analysing the bit activity must be designed and implemented. The result is that the chip area and energy saved by the reduced bit width must be used again for the unit for analysing the bit activity, as a rule, so that the solution described does not represent a gain in all cases.

Figure 1:
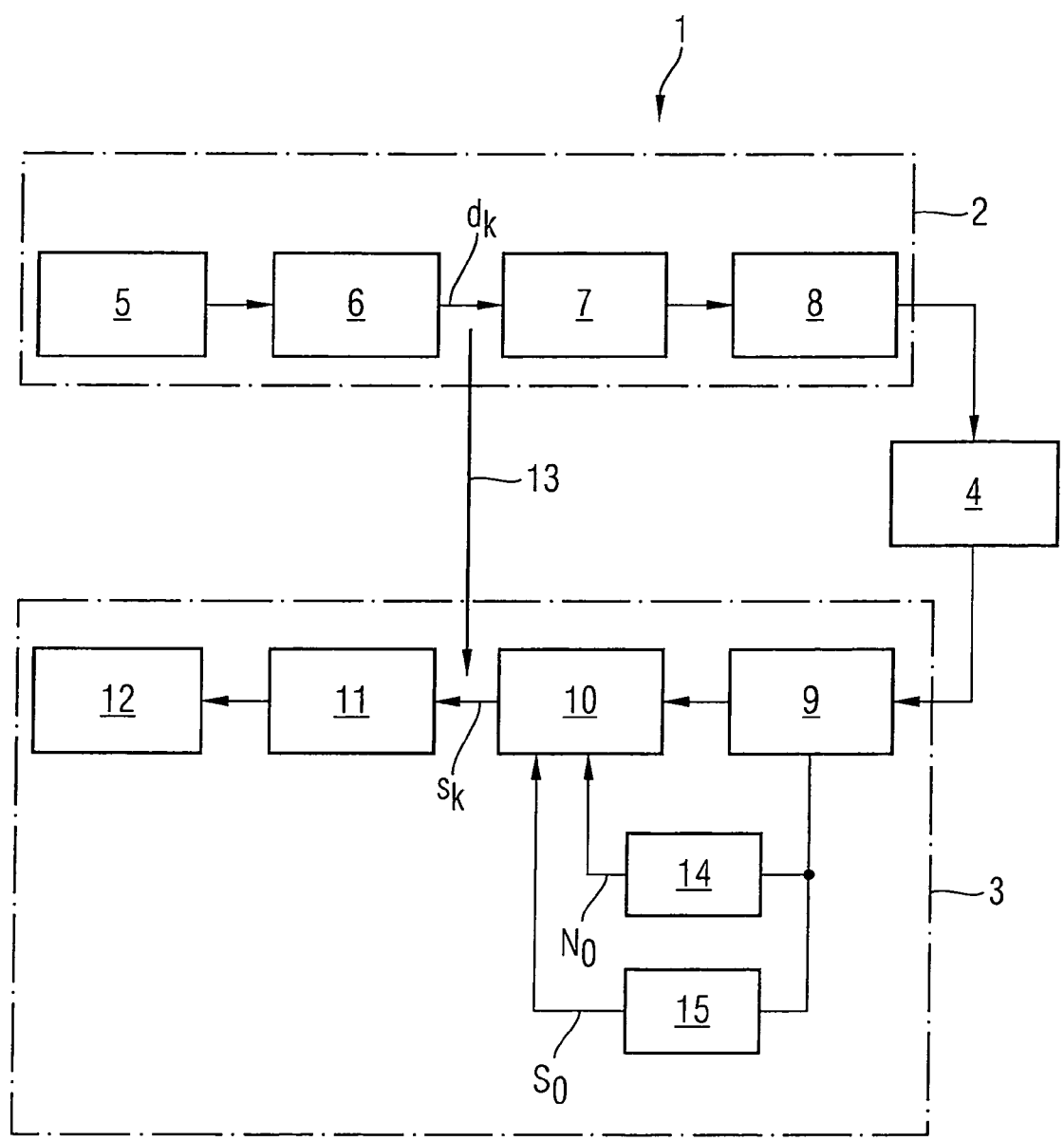
FIG. 1 shows a diagrammatic representation of a radio transmission system as illustrative embodiment of the radio receiver according to the invention.

FIG. 1 diagrammatically shows a radio transmission system 1. The radio transmission system 1 comprises a radio transmitter 2 and a radio receiver 3 which is used as illustrative embodiment for the radio receiver according to the invention. Between the radio transmitter 2 and the radio receiver 3, signals are transmitted via a transmission channel 4.

The radio transmitter 2 consists of processing units 5, an outer transmitter 6, an inner transmitter 7 and a radio-frequency unit 8. The processing units 5 represent a data source and supply bit sequences, which are to be transmitted to the radio receiver 3, to the outer transmitter 6. The bit sequences are converted into bits $d_k$ by coding by the outer transmitter 6. The inner transmitter 7 then modulates the bits $d_k$ onto a carrier frequency so that the signals obtained from this can be radiated by the radio-frequency unit 8.

The signals emitted by the radio transmitter 2 are transmitted via the transmission channel 4 and received by the radio receiver 3. The radio receiver 3 attempts to reconstruct the original bit sequences from the received signals. For this purpose, the radio receiver 3 has a radio-frequency unit 9, an inner receiver 10, an outer receiver 11 and processing units 12. The signals received by the radio-frequency unit 9 are down converted and sampled in the inner receiver 10 and then demodulated. At the output of the inner receiver 10, softbits $s_k$ are provided. The softbits $s_k$ represent the reconstruction of the bits $d_k$ generated by the outer transmitter 6. The mapping of the bits $d_k$ onto the softbits $s_k$ is represented by an arrow 13 in FIG. 1. The inner receiver 10 has the task of providing for the highest possible quality of the softbits $s_k$, i.e. reconstructing the original bits $d_k$ as well as possible. At the same time, a minimum number of bits is to be used for the number representation of the softbits $s_k$. The softbits $s_k$ are then decoded by the outer receiver 11 and then processed further by the processing units 12.

Figure 2:
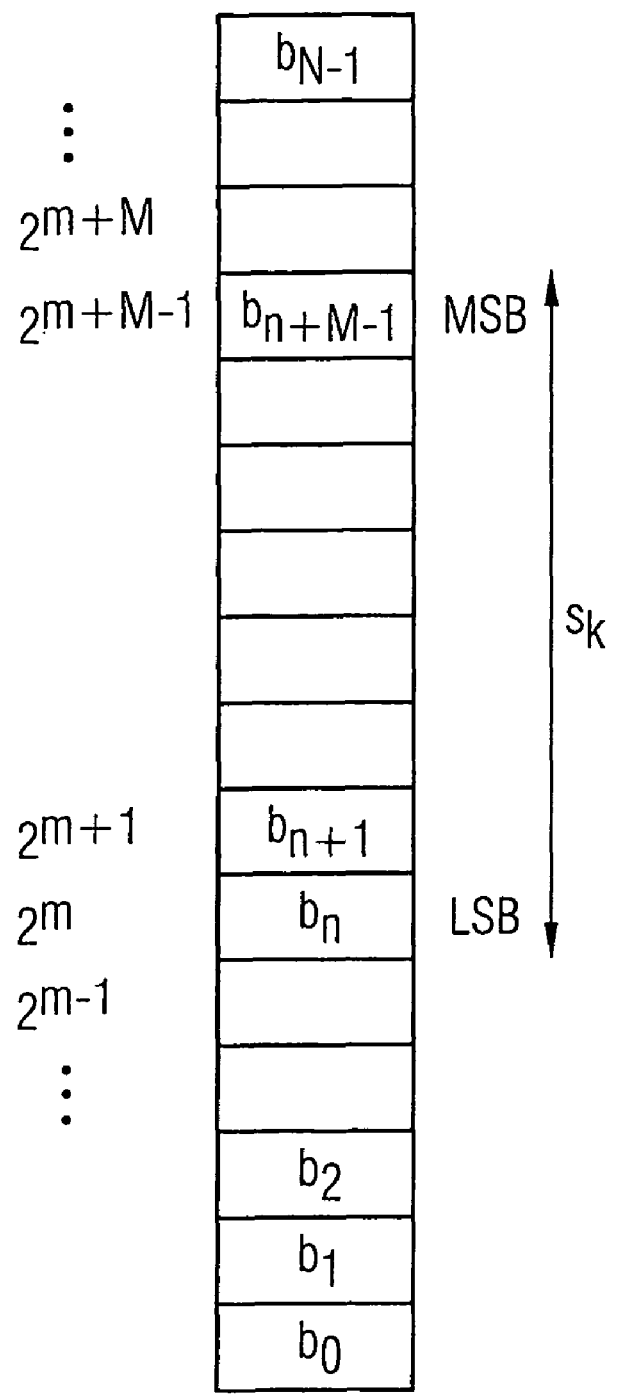
FIG. 2 shows a fixed-point number representation of the softbits $s_k$.

In the text which follows, the efficient selection of softbits $s_k$ at the output of the inner receiver 10 is described. To illustrate the method applied for this purpose, FIG. 2 shows the softbits $s_k$ in a fixed-point number representation. The following number representation was selected:

$$s_k = b_{n+M-1} \cdot 2^{m+M-1} b_{n+M-2} 2^{m+M-2} + \ldots + b_{n+1} \cdot 2^{m+1} + b_n \cdot 2^m \tag{5}$$

In equation (5), the coefficients $b_x$ designate the bits. The power of two forming a product with the respective bit $b_x$ specifies the weighting of the bit $b_x$. The parameter M designates the bit width of the softbits $s_k$. In the case of numbers with signs, the word width of the softbits $s_k$ is increased by one bit to M+1.

To determine the value set of the softbits $s_k$, the weighting $2^m$ of the least significant bit $b_n$ (LSB) of the softbits $s_k$ is first determined. Then the weighting $2^{m+M-1}$ of the most significant bit $b_{n+M-1}$ (MSB) of the softbits $s_k$ is determined. The weighting $2^{m+M-1}$ of the most significant bit $b_{n+M-1}$ can also be automatically determined from the weighting $2^m$ of the least significant bit $b_n$ if the bit width M of the softbits $s_k$ has been determined right from the start. The parameters thus obtained are used by a scaler integrated in the inner receiver 10 for generating the softbits $s_k$ within the particular range of bits.

The invention provides that the radio receiver 3 contains an estimating unit 14 for estimating the noise power $N_0$ of the received signal. The estimated noise power $N_0$ is forwarded by the estimating unit 14 to the inner receiver 10. The invention also provides that the range of bits of the softbits $s_k$ is selected in such a manner that the quantization noise power $N_Q$ generated by quantization is small in comparison with the noise power $N_0$ of the softbits $s_k$ which is present in any case. For this purpose, the weighting $2^m$ of the least significant bit $b_n$ of the softbits $s_k$ is selected in dependence on the noise power $N_0$.

The following holds true for the uniformly distributed quantization noise power $N_Q$:

$$N_Q = \frac{\Delta^2}{12}, \tag{6}$$

where $\Delta$ specifies the quantization step width obtained from the weighting $2^m$ of the least significant bit $b_n$:

$$\Delta = 2^m \quad (7)$$

According to the invention, the weighting $2^m$ of the least significant bit $b_n$ is selected in such a manner that the maximum quantization error $2^{m-1}$ is small in comparison with the noise power $N_0$. A practicable value for the maximum quantization error $2^{m-1}$ is obtained from the following equation:

$$2^{m-1} \leq \frac{\sqrt{N_0}}{10} = \frac{\sigma}{10} \quad (8)$$

In equation (8), $\sigma$ stands for the standard deviation of the noise. For the standard deviation $\sigma$, $\sigma^2 = N_0$ in the case of white noise. In principle, the maximum quantization error $2^{m-1}$ can be freely predetermined according to the invention as long as it is smaller than the standard deviation $\sigma$.

From equation (8), the following defining equation is obtained for the weighting $2^m$ of the least significant bit $b_n$:

$$2^m \leq \frac{\sqrt{N_0}}{5} = \frac{\sigma}{5} \quad (9)$$

Combining equations (6) to (8) results in:

$$N_Q = \frac{\Delta^2}{12} = \frac{\sigma^2}{12 \cdot 25} = \frac{N_0}{300} \quad (10)$$

Whereas the signal-noise power ratio is $S_0/N_0$ before the quantization, it is reduced to the following value after the quantization:

$$\frac{S_0}{N_0 + N_Q} = \frac{S_0}{N_0 + N_0/300} = \frac{S_0}{N_0} \cdot 0.9967 \quad (11)$$

This corresponds to an impairment by 0.0145 dB. In most cases, such an impairment is negligible.

In principle, it is also possible to specify a maximum permissible degradation of the signal-noise power ratio and to calculate from this the weighting $2^m$ of the least significant bit $b_n$ by means of equations (6), (7) and (11).

There are two possibilities available for determining the weighting $2^{m+m-1}$ of the most significant bit $b_{n+M-1}$ of the softbits $s_k$. On the one hand, the bit width M of the softbits $s_k$ can be predetermined right from the start. After the weighting $2^m$ of the least significant bit $b_n$ has been determined, this automatically results in the weighting $2^{m+M-1}$ of the most significant bit $b_{n+M-1}$. On the other hand, the weighting $2^{m+M-1}$ of the most significant bit $b_{n+M-1}$ can also be determined by means of the received radio signal. This is described in the text which follows.

The weighting $2^{m+M-1}$ of the most significant bit $b_{n+M-1}$ can be determined by means of the maximum useful signal contribution of the received signal. In the case of the softbits $s_k$, the useful signal contribution is typically the result of three multiplicative contributions. On the one hand, the symbols obtained from the bits $d_k$ by modulation in the radio transmitter 2 are in each case multiplied by a gain factor during transmission and during reception. On the other hand, there is also a specific weighting for the transmission channel 4. Accordingly, a signal power estimation can supply a relatively accurate estimation of the maximum useful signal contribution. For modulation methods with symbols of equal energy such as, for example, BPSK, QPSK, but not QAM methods with higher values, the signal contribution is then equal to $\sqrt{S_0}$, where $S_0$ specifies the signal power of the received signals. So that no impairment of the signal-noise power ratio by the choice of weighting $2^{m+M-1}$ of the most significant bit $b_{n+M-1}$ is generated, the maximum signal contribution should be less than twice the weighting $2^{m+M-1}$ of the most significant bit $b_{n+M-1}$, i.e. the maximum signal contribution should be less than $2^{m+M}$. However, it is practicable also to take into consideration estimation inaccuracies of the signal power. It is appropriate, therefore to estimate a factor of 2 as reserve so that the following applies for the weighting $2^{m+M-1}$ of the most significant bit $b_{n+M-1}$:

$$2^{m+M-1} = \sqrt{S_0} \quad (12)$$

To be able to determine the weighting $2^{m+M-1}$ of the most significant bit $b_{n+M-1}$ by means of equation (12), the signal power $S_0$ of the received signals must be known. This is estimated by means of an estimating unit 15 in the radio receiver 3 and forwarded to the inner receiver 10.

From equation (12), together with equation (8), the bit width M of the softbits $s_k$ can be determined:

$$M = \left\lceil \log_2 10 + \frac{1}{2} \log_2 \frac{S_0}{N_0} \right\rceil \quad (13)$$

To obtain the bit width M from equation (13), the number obtained from the term on the right-hand side of equation (13) must be rounded up to the next higher whole number.

On the basis of the illustrative embodiment described above, a further illustrative embodiment of the radio receiver according to the invention will be described in the text which follows. In this illustrative embodiment, the inner receiver 10 is implemented by a RAKE receiver and the signals are transmitted according to the UMTS standard. Conservatively, the range of the signal-noise power ratio in which the RAKE receiver 10 is to operate can be estimated from 0 dB to 15 dB. According to equation (13), this results in a bit width requirement of M+1=5 to M+1=7, the summand 1 on the right-hand sides of the preceding equations being caused by the sign of the softbits $s_k$. The weightings $2^m$ and $2^{m+M-1}$, which determine the value set of the softbits $s_k$, can be calculated with the aid of equations (9) and (12).

To make the determination of the best possible range of values of the softbits $s_k$ described even more efficient, some modifications can be undertaken in practice. Thus, in order to avoid unnecessary circuit expenditure, it is appropriate to make the bit width M not completely variable but to provide a minimum bit width M. According to the above estimation, therefore, at least 5 bits are necessary for the number representation of the softbits $s_k$ for the RAKE receiver 10.

A further simplification relates to the estimations of the noise power $N_0$ and of the signal power $S_0$. As a rule, these estimations are obtained from interpolations. However, the range of bits of the softbits $s_k$ must be correctly selected for a certain period of time. In the UMTS standard, these can be slots, frames or TTIs. To ensure that a tolerable maximum quantization degradation can be achieved over the selected period of time with the selected range of bits of the softbits $s_k$, the noise power $N_0$ and the signal power $S_0$ must be replaced by the minimum and maximum values, respectively, to be expected in the selected period of time. For this purpose, a prediction must be performed which typically has a greater variance. For this purpose, the estimation is restricted to the estimation of the noise power $N_0$, on the one hand, which generally can be predicted better than the signal power $S_0$. This has the result that the bit width M is kept constant. On the other hand, the variance of the noise power $N_0$ in the choice of weighting $2^m$ of the least significant bit $b_n$ according to equation (9) is taken into consideration by an additional factor 1/2, so that the following applies:

$$2^m = \frac{\sqrt{N_0}}{10} = \frac{\sigma}{10} \quad (14)$$

The weighting $2^{m+M-1}$ of the most significant bit $b_{n+M-1}$ is then selected in such a manner that the signal contribution is not within the saturated range of the quantization characteristic even with a maximum signal-noise power ratio $(S_0/N_0)_{max}$ to be expected. Accordingly, the following applies for the bit width M:

$$M = \left\lceil \log_2 20 + \frac{1}{2}\log_2\left(\frac{S_0}{N_0}\right)_{max} \right\rceil \quad (15)$$

For a maximum signal-noise power ratio of 15 dB, this results in M+1=8 bits.

The modifications described above for applying the invention to a RAKE receiver which operates in accordance with the UMTS standard provide for robust use without sacrificing the basic advantages of the invention. Similar modifications are appropriate for other receiver designs.

The expert knows many different methods by means of which he can estimate signal and noise powers of received signals. In UMTS systems, as a rule, these estimations are based on an examination of the pilot symbols of the DPCH channel. In addition, the pilot symbols of the CPICH channel can also be used for this purpose.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising."

What is claimed is:

1. A radio receiver for receiving received signals transmitted via radio, the radio receiver comprising:
   a first estimating unit for estimating noise power of the received signals as an estimated noise power;
   a demodulation unit for demodulating the received signals as softbits, wherein the demodulation unit sets a weighting of a least significant bit of the softbits according to the estimated noise power; and
   wherein the demodulation unit is configured to set the weighting of the least significant bit of the softbits according to an equation:

$$2^m \leq \frac{\sqrt{N_0}}{5}$$

where $2^m$ is the weighting of the least significant bit of the softbits and $N_0$ is the estimated noise power of the received signals, or
   wherein the demodulation unit is configured to set a weighting of a most significant bit of the softbits according to an equation:

$$2^{m+M-1} = \sqrt{S_0}$$

where $2^{m+M-1}$ is the weighting of the most significant bit of the softbits and $S_0$ is an estimated signal power of the received signals, or
   wherein the least significant bit of the softbits is weighted independent of the signal power.

2. The radio receiver of claim 1, wherein a bit width of the softbits is predetermined.

3. The radio receiver of claim 1, further comprising an outer receiver that decodes the softbits.

4. The radio receiver of claim 1, wherein the demodulation unit holds the weighting of the least significant bit of the softbits and the weighting of the most significant bit of the softbits constant over a predetermined period of time.

5. A radio receiver for receiving received signals transmitted via radio, the radio receiver comprising:
   a first estimating unit for estimating noise power of the received signals as an estimated noise power;
   a demodulation unit for demodulating the received signals as softbits, wherein the demodulation unit sets a weighting of a least significant bit of the softbits according to the estimated noise power; and
   a second estimating unit for estimating a signal power of the received signals,
   wherein the demodulation unit sets a weighting of a most significant bit of the softbits according to the estimated signal power independent of the estimated noise power, or
   wherein a bit width of the softbits is predetermined and the demodulation unit sets the weighting of the least significant bit of the softbits according to a square root of the estimated noise power of the received signals.

6. The device of claim 5, wherein a bit width of the softbits is predetermined and the demodulation unit sets the weighting of the least significant bit of the softbits according to an equation:

$$2^m \leq \frac{\sqrt{N_0}}{10}$$

where $2^m$ is the weighting of the least significant bit of the softbits and $N_0$ is the estimated noise power of the received signals.

7. The radio receiver of claim 5, wherein the least significant bit of the softbits and the most significant bit of the softbits are weighted independent from each other.

8. The radio receiver of claim 5, wherein the least significant bit of the softbits is weighted independent of the signal power.

9. A method for processing received signals received by a radio receiver, the method comprising:
 estimating a noise power of the received signals;
 demodulating the received signals as softbits and setting a weighting of a least significant bit of the softbits according to the estimated noise power; and
 wherein setting the weighting of the least significant bit of the softbits comprises setting the weighting of the least significant bit of the softbits according to an equation:

$$2^m \leq \frac{\sqrt{N_0}}{5}$$

wherein $2^m$ is the weighting of the least significant bit of the softbits and $N_0$ specifies the estimated noise power of the received signals, or
wherein setting the weighting of the least significant bit of the softbits comprises setting the weighting of the least significant bit of the softbits according to an equation:

$$2^m \leq \frac{\sqrt{N_0}}{10}$$

where $2^m$ is the weighting of the least significant bit of the softbits, $N_0$ specifies the estimated noise power of the received signals, and the softbits have a predetermined bit width, or
wherein the least significant bit of the softbits is weighted independent of the signal power.

10. The method of claim 9, wherein demodulating the received signals as softbits comprises employing a predetermined bit width.

11. A method for processing received signals received by a radio receiver, the method comprising:
 estimating a noise power of the receives signals;
 demodulating the received signals as softbits and setting a weighting of a least significant bit of the softbits according to the estimated noise power; and
 estimating a signal power of the received signals and setting a weighting of a most significant bit of the softbits according to the estimated signal power,
 wherein weighting of the most significant bit of the softbits is independent of the estimated noise power.

12. The method of claim 11, wherein the weighting of the least significant bit of the softbits and the weighting of the most significant bit of the softbits are kept constant over a predetermined period of time.

13. The method of claim 11, wherein the least significant bit of the softbits and the most significant bit of the softbits are weighted independent from each other.

14. The method of claim 11, wherein the least significant bit of the softbits is weighted independent of the signal power.

15. A method for processing received signals received by a radio receiver, the method comprising:
 receiving the received signals;
 estimating a noise power of the receives signals;
 demodulating the received signals as softbits and setting a weighting of a least significant bit of the softbits according to the estimated noise power; and
 quantizing the demodulated received signals to obtain a maximum quantization noise power, wherein setting the weighting of the least significant bit of the softbits comprises setting the weighting of the least significant bit of the softbits to have a maximum quantization noise power less than the estimated noise power.

16. A method for processing received signals received by a radio receiver, the method comprising:
 estimating a noise power of the receives signals;
 demodulating the received signals as softbits and setting a weighting of a least significant bit of the softbits according to the estimated noise power; and
 setting a weighting of a most significant bit of the softbits according to an estimated signal power of the received signals without saturating the softbits, or
 setting a weighting of a most significant bit of the softbits according to a square root of the estimated signal power of the received signals, or
 setting a weighting of a most significant bit of the softbits according to a predetermined value, wherein the softbits have a predetermined minimum bit width,
 wherein the least significant bit of the softbits is weighted independent of the estimated signal power of the received signals.

17. The method of claim 16, comprising:
 setting a weighting of a most significant bit of the softbits according to an equation:

$$2^{m+M-1} = \sqrt{S_0}$$

where $2^{m+M-1}$ is the weighting of the most significant bit of the softbits and $S_0$ specifies an estimated signal power of the received signals.

18. The method of claim 16, wherein the least significant bit of the softbits and the most significant bit of the softbits are weighted independent from each other.

* * * * *